United States Patent [19]

Ueyoko et al.

[11] Patent Number: 5,522,443

[45] Date of Patent: Jun. 4, 1996

[54] HIGH SPEED HEAVY DUTY TIRE AND RIM ASSEMBLY WHOSE TIRE INCLUDES A BUFFER LAYER IN EACH BEAD PORTION

[75] Inventors: Kiyoshi Ueyoko, Osaka; Hiroshi Hoshino, Kobe; Mikio Takatsu, Takarazuka, all of Japan

[73] Assignee: Sumitomo Rubber Industries, Ltd., Hyogo-ken, Japan

[21] Appl. No.: 268,729

[22] Filed: Jun. 30, 1994

Related U.S. Application Data

[63] Continuation of Ser. No. 921,138, Jul. 29, 1992, abandoned, which is a continuation-in-part of Ser. No. 666,377, Mar. 8, 1991, abandoned.

[30] Foreign Application Priority Data

Mar. 16, 1990 [JP] Japan .................................. 2-67452

[51] Int. Cl.$^6$ ............................... B60C 9/02; B60C 9/08; B60C 15/00; B60C 15/06

[52] U.S. Cl. ................... 152/542; 152/454; 152/539; 152/543; 152/546; 152/548; 152/552; 152/553; 152/556; 152/564

[58] Field of Search ...................... 152/542, 548, 152/556, 564, 543, 539, 546, 553, 459, 552

[56] References Cited

U.S. PATENT DOCUMENTS

| | | | |
|---|---|---|---|
| 2,131,636 | 9/1938 | Nellen | 152/542 X |
| 2,501,372 | 3/1950 | Benson | 152/542 |
| 2,902,073 | 9/1959 | Lessig | 152/542 |
| 4,024,901 | 5/1977 | Poqué | 152/542 X |
| 4,657,058 | 4/1987 | Kabe et al. | 152/564 X |
| 4,890,659 | 1/1990 | Harakon et al. | 152/527 X |
| 4,987,939 | 1/1991 | Yamada et al. | 152/564 X |
| 5,160,384 | 11/1992 | Ueyoko et al. | 152/547 X |

FOREIGN PATENT DOCUMENTS

| | | | |
|---|---|---|---|
| 0435622 | 7/1991 | European Pat. Off. | 152/547 |

OTHER PUBLICATIONS

*Mechanics of Pneumatic Tires*, ed Samuel Clark; U.S. Dept. of Transportation, Aug. 1981, p. 131.

*Primary Examiner*—Adrienne C. Johnstone
*Attorney, Agent, or Firm*—Birch, Stewart Kolasch & Birch

[57] ABSTRACT

A pneumatic tire for high speed and heavy duty use, in which durability of the bead and lower sidewall region is improved. The tire includes: a carcass comprising a radial ply of cords turned up around bead cores from the axially inside to the outside, the carcass cords rubberized with a topping rubber having a 100% modulus of 40 to 70 kg/cm$^2$, an elongation at rupture of 200 to 350%, and a stress at rupture of 150 to 300 kg/cm$^2$; a rubber bead apex disposed between the carcass main portion and each turned up portion; a buffer cord layer interposed between the carcass main portion and each turned up portion, the buffer cord layer extending radially inwardly to the bead portion to form an axially inner portion and then turned up around the bead core to form an axially outer portion, the axially inner portion having a radially outer edge located radially outward of the radially outer edge of the carcass turned up portion and radially inward of the maximum tire section width point, the axially outer portion having a radially outer edge located radially inward of the middle height position of the bead apex; in a normal pressure condition, at least 60%, in number, of the spacings of reinforcing cords existing in a tire side portion defined between two points (P1 and P2) are in the range of 0.25 to 2.0 times the thickness (D) of the carcass cords, the reinforcing cords including the carcass cords and the buffer cords.

6 Claims, 3 Drawing Sheets

HIGH SPEED HEAVY DUTY TIRE AND RIM ASSEMBLY WHOSE TIRE INCLUDES A BUFFER LAYER IN EACH BEAD PORTION

This application is a continuation, of application Ser. No. 07/921,138 filed on Jul. 29, 1992 which is now abandoned, which is a continuation-in-part of application Ser. No. 07/666,377 filed on Mar. 8, 1991 now abandoned.

BACKGROUND OF THE INVENTION

The present invention relates to a pneumatic tire for high speed and heavy duty use, in which durability of the bead and lower sidewall region is improved, and is suitably applied to airplane tires especially for large-sized airplane.

Recently, even in tires for heavy load and high speed use, e.g. tires for aircraft, radial carcasses came into use in order to improve structural durability, running performance, fuel consumption performance and the like.

In the radial tires for aircraft, the bead portions are subjected to a large bend deformation under heavy load conditions, and internal temperature of the bead portion is greatly increased by high speed running during taking-off and landing of aircraft, which causes bead damages, e.g. separation failure between the adjacent plies and between reinforcement cords and the surrounding rubber.

Even when the running speed is low, if the running time is long, for example during taxiing of aircraft, internal temperature is increased. In this case, in addition to the above-mentioned damages, a rubber breakage extending from the cords to the outer surface of the tire sidewall is caused at a position near the carcass edges.

In order to prevent such failures by reducing the temperature rise, a rubber with a low heat generation property has been used in the bead portion and a lower sidewall portion.

It was, however, found that contrary to our expectations, such a low heat generation rubber tends to induce bead damage at an early stage of the tire life during both a high speed running and a low speed running.

As the result of our various researches, it was found that the distances between the adjacent carcass cords located in the bead portion and a lower sidewall portion influence damage of the bead.

In a rubber with a low heat generation property, a heat generation caused by its bending deformation is small, but its strength is not so large. Therefore, when the above-mentioned distances between the adjacent cords are small, a shear stress generated in the rubber between the cords is increased to cause a separation failure of the carcass cords from the surrounding rubber.

On the other hand, the carcass plies are turned up around the bead cores to be secured thereto as shown in FIG. 3. According to a prior art, the carcass turned up portion A2 is extended along the carcass main portion A1 while contacting directly thereto.

When such a tire is inflated to a high pressure and greatly deflected, in a lower sidewall portion C, a large tensile stress F is worked in the opposite directions between the main portion A1 and the turned up portion A2 of the carcass A. As a result, a large shear exists between the carcass turned up portion and the adjacent carcass main portion.

Further, as the deflection is very large, a compressive stress is generated in the axially outer sidewall portion, and a tensile stress is generated in the axially inner sidewall portion, which further amplifies the shear. And cord end looseness or carcass ply edge separation which extends to a bead damage is liable to be induced at the radially outer edge of the carcass turned up portion A2.

In order to reduce bead deformation, for example, if the thickness and height of bead apexes are increased, the bead volume increases to increase the tire weight, and the heat generation therefrom also increases, which reduces the bead durability.

SUMMARY OF THE INVENTION

It is therefore, an object of the present invention to provide a high speed heavy duty tire, in which the durability of the bead portion and sidewall lower portion is improved.

According to one aspect of the present invention, a tire for high speed and heavy duty use mounted on a flanged rim comprises a regular flanged rim and a tire, the tire including a pair of bead portions, a tread portion, a pair of sidewall portions extending between the tread edges and the bead portions, a pair of bead cores disposed one in each bead portion, a radial carcass having at least one ply of carcass cords extending between the bead portions and turned up around the bead cores from the axially inside to the outside thereof to form two turned up portions and one main portion of the carcass, the carcass ply including carcass cords embedded in a carcass cord topping rubber, a bead apex disposed between the carcass main portion and each turned up portion and extending radially outwardly from the bead core, a buffer layer having a ply of buffer cords interposed between the carcass main portion and each turned up portion and extending radially inwardly to the bead portion to form an axially inner portion, the buffer layer turned up around the bead core and extending radially outwardly to form an axially outer portion, in a normal pressure condition in which the tire is mounted on its regular rim and inflated to its regular inner pressure, at least 60%, in number, of the spacings of reinforcing cords existing in a tire side portion defined between two points P1 and P2 being in the range of 0.25 to 2.0 times the thickness (D) of the carcass cords, the reinforcing cords including the carcass cords and the buffer cords, wherein the point P1 is located on the outer surface of the tire at a height corresponding to the height of a flange of the rim and the point P2 is located on the outer surface of the tire at a height of ⅓ times the tire section height, and the carcass cord topping rubber having the following properties:

a 100% modulus of from 40 to 70 kg/sq.cm, an elongation at rupture of from 200 to 350%, and a stress at rupture of from 150 to 300 kg/sq.cm, the radially outer edge of the axially inner portion of the buffer layer located radially outward of the radially outer edge of the carcass turned up portion and radially inward of the maximum tire section width point within the tire sidewall portion, the radially outer edge of the axially outer portion of the buffer layer located radially inward of the middle height position of the bead apex defined between the radially outer edge of the bead apex and the radially outer edge of the bead core.

DESCRIPTION OF THE PREFERRED EMBODIMENT

Figure 1:
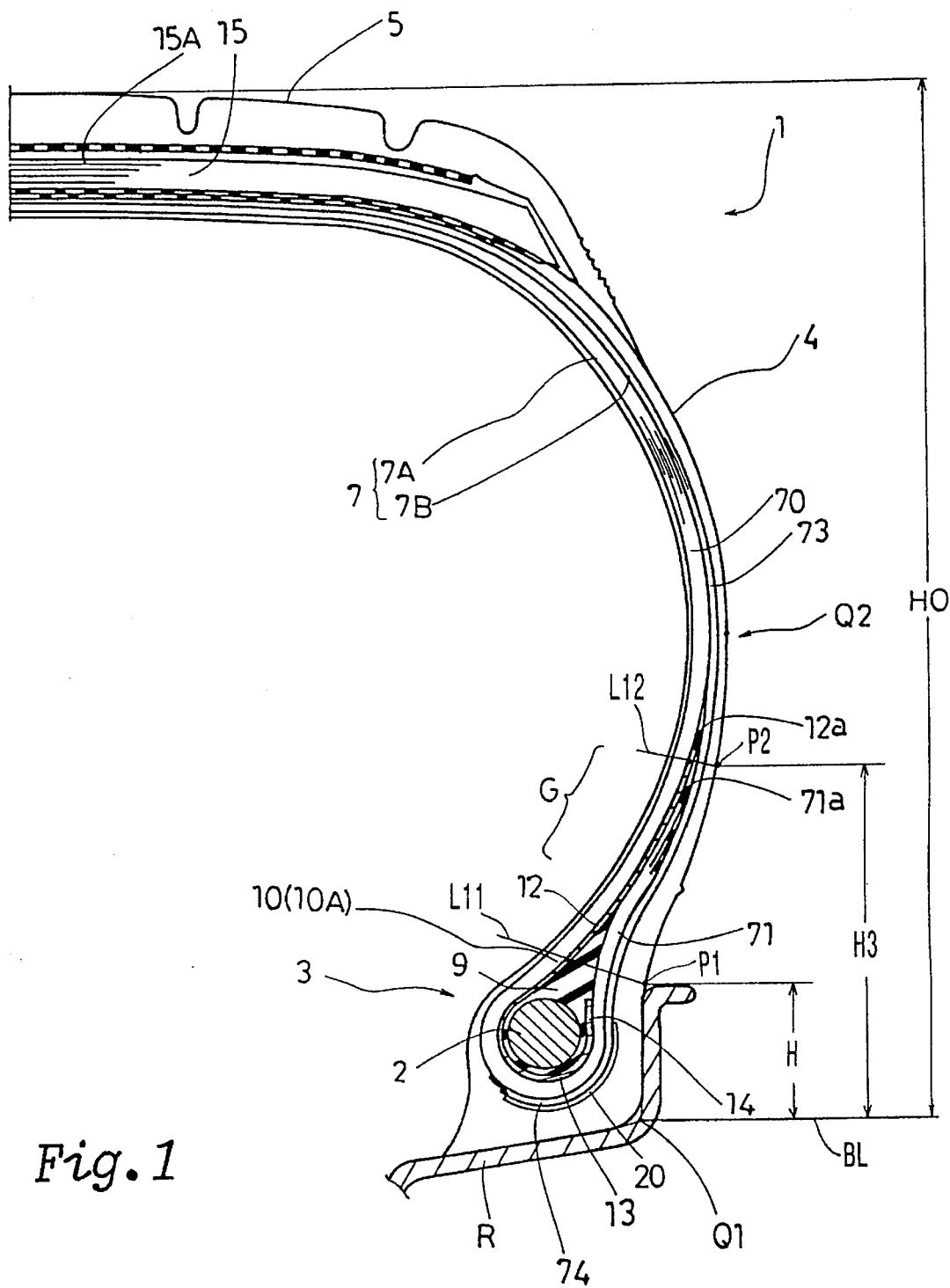
FIG. 1 is a cross sectional view of a right half of a radial ply tire for airplane according to the present invention.

An embodiment of the present invention will now be described in detail in conjunction with the accompanying drawings In Figs.1 and 2, the tire 1 according to the invention is for airplane, and the tire size is 46X17R20. Its unloaded normal state that the tire 1 is mounted on its regular rim R and inflated to its regular inner pressure is shown.

The tire 1 has a tread portion 5, a pair of axially spaced bead portions 3, and a pair of sidewall portions 4 extending between the bead portions and the tread edges.

The rim R comprises a pair of tapered bead seats Rb and a pair of flanges Ra extending radially outwardly from the axially outer edges of the bead seats Rb. The bottom Face and side Face of each bead portion 3 fit with the bead seat Ra and the flange Rb of the rim, respectively.

The tire comprises a bead core 2 disposed in each bead portion 3, a carcass 7 extending between the bead portions 3 and turned up around the bead cores 2 to be secured thereto, a tread reinforcing belt disposed radially outside the carcass 7.

In this embodiment, each bead portion 3 is provided with only one bead core 2 having a round cross sectional shape, but other shapes, for example, hexagon, square and the like may be used.

The carcass 7 comprises a plurality of plies of cords extending between the bead portions and turned up around the bead cores.

In this embodiment, the carcass 7 is composed of an inner carcass 7A and an outer carcass 7B.

The inner carcass 7A comprises a plurality of plies (in this example four plies) all of which plies are turned up around the bead cores 2 from the axially inside to outside thereof, whereby the inner carcass 7A has two turned up portions 71 at the respective axial edges of its main portion 70.

The outer carcass 7B comprises a plurality of plies (in this embodiment two plies) which plies are disposed directly on the outer surface of the inner carcass 7A. In each bead portion, the plies extend from axially outward to inward of the bead core along the inner carcass 7A so that
the lower main portion of the outer carcass 7B covers the ply edges of the turned up portion 71 of the inner carcass 7A, and
a base portion 74 is formed at the radially inner edge of the main portion 73.

In each of the carcass plies, the carcass cords 8 are arranged radially at an angle of 70 to 90 degrees with respect to the tire equator and embedded in a topping rubber compound 18.

For the carcass cords 8 in the inner and outer carcasses, organic fiber cords, e.g. rayon, polyester, VINYLON, nylon, aromatic polyamide and the like are used.

In this embodiment, the carcass plies are alternately inclined with respect to the tire equator so that the adjacent plies cross each other.

In each of the turned up portions 71 of the inner carcass 7A, all the carcass plies extend radially outwardly along the axially outer surface of a bead apex 9 described later, and they are terminated so that the axially outer the turnup position, the lower the termination.
The height H1 of the lowest turnup (accordingly the axially outermost turnup) is larger than the height H2 of the bead apex 9, both from the bead base line BL, which line passes a heel point Q1 in parallel with the tire axis. The heel point Q1 is defined as an intersection between an extension line of the bead bottom face and an extension line of the bead side face.
Therefore, a region G devoid of bead apex rubber is formed between the carcass main portion and each turned up portion.
In the tread portion 5, a tread reinforcing belt is disposed radially outside the carcass 7 and radially inside the rubber tread.
In this embodiment, the belt comprises a radially outermost protector belt, a radially innermost breaker belt, and an in-between band belt.
The band belt 15 is composed of a plurality of plies 15A (in this example 8 plies) of cords laid at an angle 0 to 30 degrees with respect to the tire equator.
The widths of the plies are about 70 to 85% of the tire section width, which are selected such that the axially inner the belt ply position, the larger the width, and the edges of the plies 15A or the envelopes to the edges are inclined almost parallel with the contour of the tire shoulder profile.
Each bead portion 3 is provided with a bead apex 9 between the main portion 70 and each turned up portion 71 of the inner carcass 7A.
The bead apex 9 extends taperingly radially outwardly from the radially outside of the bead core 2. The height H2 of the bead apex 9 is larger than the height H of the rim flange Ra.
Preferably, the bead apex 9 is made of relatively hard rubber having a JIS-A hardness of 65 to 95 degrees.
In each of the bead portion 3, a buffer cord layer 10 is disposed between the main portion 70 and the turned up portion 71 of the inner carcass 7A.
The buffer cord layer 10 consists of at least one ply, in this embodiment one ply 10A of rubberized parallel organic fiber cords 11 arranged at an angle of 70 to 90 degrees with respect to the tire equator.
As the buffer cords 11, organic fiber cords having the same strength as or more strength than the carcass cords 8, for example rayon, polyester, vinylon, nylon, aromatic polyamide fiber cords and the like are used.
The buffer cord layer 10 extends continuously between its radially outer edge 12a and inner edge 14a along the inner carcass 7A while contacting with the surface thereof.
Here, the radially outer edge 12a is positioned radially outward of the radially outer edge 71a of the turned up portion 71 of the inner carcass 7A and radially inward of the maximum tire section width point Q2 within the sidewall region 4.
If the radially outer edge 12a of the buffer layer is terminated radially outward of the maximum tire section width point Q2, a radially outward force is applied, and a shearing stress is generated between the main portion of the buffer cord layer and the carcass turned up portion 71.
The radially outer edge 14a of the axially outer portion 14 of the buffer cord layer 10 is positioned radially inside a position of a height h1. The height h1 corresponds to the middle of the bead apex height defined as from the radially outer edge of the bead core 2 to the radially outer edge of bead apex 9. As the region from this position to the bead base is a very stable region secured between the rigid bead core 2 and rim flange Ra and therefore the occurrence of cord looseness at the edge 14a is avoided.

Thus, the buffer cord layer 10 is provided with a portion 12 interposed between the inner carcass main portion 70 and the axially inner surface of the bead apex 9, a portion 13 interposed between the inner carcass 7A and the bead core 2, and a portion 14 interposed between the inner carcass turned up portion 71 and the axially outer surface of the bead apex 9.

According to the present invention, in a specific portion comprising a bead upper portion and a sidewall lower portion, the cord spacings between the adjacent reinforcing cords: the carcass cords 8, the buffer cords 11 and other cords if any, are specifically defined, wherein such specific portion is defined between a straight line L11 drawn perpendicularly to the outer surface of the tire from a point P1 and a straight line L12 drawn perpendicularly to the outer surface of the tire from a point P2.

Here, the point P1 is located on the outer surface of the tire at a height H corresponding to the height of the rim flange Ra.

The point P2 is located on the outer surface of the tire at a height H3 of ⅓ times the tire section height HO, wherein the above-mentioned heights are measured radially from the bead base line BL. In such annular portion, a large bend deformation occurs when in a ground contacting patch of the tire, therefore bead damage is most liable to occur. To prevent this, under the above-mentioned normal pressure condition, the cord spacings are set to be in the range of 0.25 to 2.0 times the thickness D of the carcass cords 8, whereby the shear strain between the cords by bend deformation can be mitigated by the rubber existing between the cords. As a result, rubber breakage and cord separation failure are prevented, and durability is improved.

To achieve this, the above-mentioned regulation of the cord spacings must be succeeded at 60% or more in the number of the cord spacings, preferably not less than 80%, and more preferably not less than 90%. Preferably, the above-mentioned cord spacings should include all of possible combinations, for example, the cord spacings in each of the carcass plies and the buffer layer ply 12, the cord spacings between the adjacent carcass plies, the cord spacings between the buffer layer ply and adjacent carcass plies.

When the cord spacings are less than 0.25 times the thickness D, the shear stress can not be fully mitigated, and rubber breakage is caused.

When the cord spacings are more than 2.0 times the thickness D, the thickness of the sidewall lower portion is excessively increased, and as a result the internal temperature thereof is increased by the bend deformation to decrease the bead durability The topping rubber thicknesses of the carcass ply and buffer cord layer are so determined.

According to the invention, the carcass cord topping rubber 18 is a rubber compound having the following characteristics:

the 100% modulus is in the range from 40 to 70 kg/sq.cm;

the elongation at rupture is in the range from 200 to 350%; and the stress at rupture is in the range from 150 to 300 kg/sq.cm.

The carcass cord topping rubber has accordingly, a higher strength in comparison with a low heat generation rubber compound, and the durability is improved.

When the 100% modulus is less than 40 kg/sq.cm, when the elongation at rupture is more than 350%, or when the stress at rupture is more than 300 kg/sq.cm, heat generation increases, and high speed durability of the bead portion is apt to be decreased.

When the 100% modulus is more than 70 kg/sq.cm, when the elongation at rupture is less than 200%, or when the stress at rupture is less than 150 kg/sq.cm, the strength of the rubber becomes insufficient, and a decrease in the bead durability by rubber breakage is liable to occur.

More preferably, the 100% modulus is in the range from 45 to 55 kg/sq.cm, the elongation at rupture is in the range from 280 to 340%, and the stress at rupture is in the range from 200 to 250 kg/sq.cm.

As the topping rubber for the buffer organic cords 11, a rubber compound similar to the carcass cord topping rubber is used to prevent separation therebetween and also to prevent separation between the cords and topping rubber. The 100% modulus of the buffer cord topping rubber is in the range of 60 to 130% of the 100% modulus of the carcass cord topping rubber.

Further, in this embodiment, the total thickness of the tire sidewall portion and the thickness of the sidewall rubber at a point Q3 are defined such that the quotient F1/X is more than 0 and not more than 0.20, and the quotient F2/X is more than the quotient F1/X and not more than 0.60, where F1 is the thickness of the sidewall rubber disposed on the carcass 7 measured at the point Q3 normally to the tire sidewall surface from this surface to the carcass 7, F2 is the total thickness of the tire sidewall portion measured at the point Q3 normally to the tire sidewall surface, and the point Q3 is on the sidewall surface and spaced radially outwardly apart from the bead base line BL by a distance h which is 20% of the tire section height HO.

By setting F1/X and F2/X in the above-mentioned ranges, the amount of bead deformation can be reduced while the heat generation being controlled.

Furthermore, in this embodiment, the bead core 2 is positioned such that the quotient X/H is in the range of 0.8 to 1.05, and the quotient Y/H is in the range of 0 to 0.3 (in this example, the radially outer edge of the bead core 2 is positioned radially inward of the radially outer edge of the rim flange Ra), where X is the axially distance measured axially inwardly from the bead base line BL to the axially inner edge of the bead core 2, H is the flange height H or the radial distance measured radially outwardly from the bead base line BL to the radially outer edge of the rim flange Ra, Y is the radial distance measured radially inwardly from the radially outer edge of the rim flange Ra to the radially outer edge of the bead core 2.

When the quotient X/H is less than 0.80, or when the quotient Y/H is more than 0.30, the amount of bead deformation increases. When the quotient X/H is more than 1.05, the volume of the bead portion 3 is excessively increased, and durability is deteriorated, and further seating of the beads on the rim becomes unstable.

More preferably, the quotient X/H is in the range of 0.85 to 1.0.

When the quotient Y/H is smaller than 0, that is, a minus value, the radially outer edge of the bead core 2 is positioned radially outward of the radially outer edge of the rim flange Ra, and the carcass 7 is bent abruptly around the radially outer edge of the bead core 2 and broken easily.

This positioning of the bead core allows the tip of the bead apex to incline axially outwardly in the unloaded state of the tire, thereby reducing the bending deformation of the bead apex from the unloaded state to greatly deflected state. As a result, heat generation is reduced to further improve the bead durability.

Figure 2:
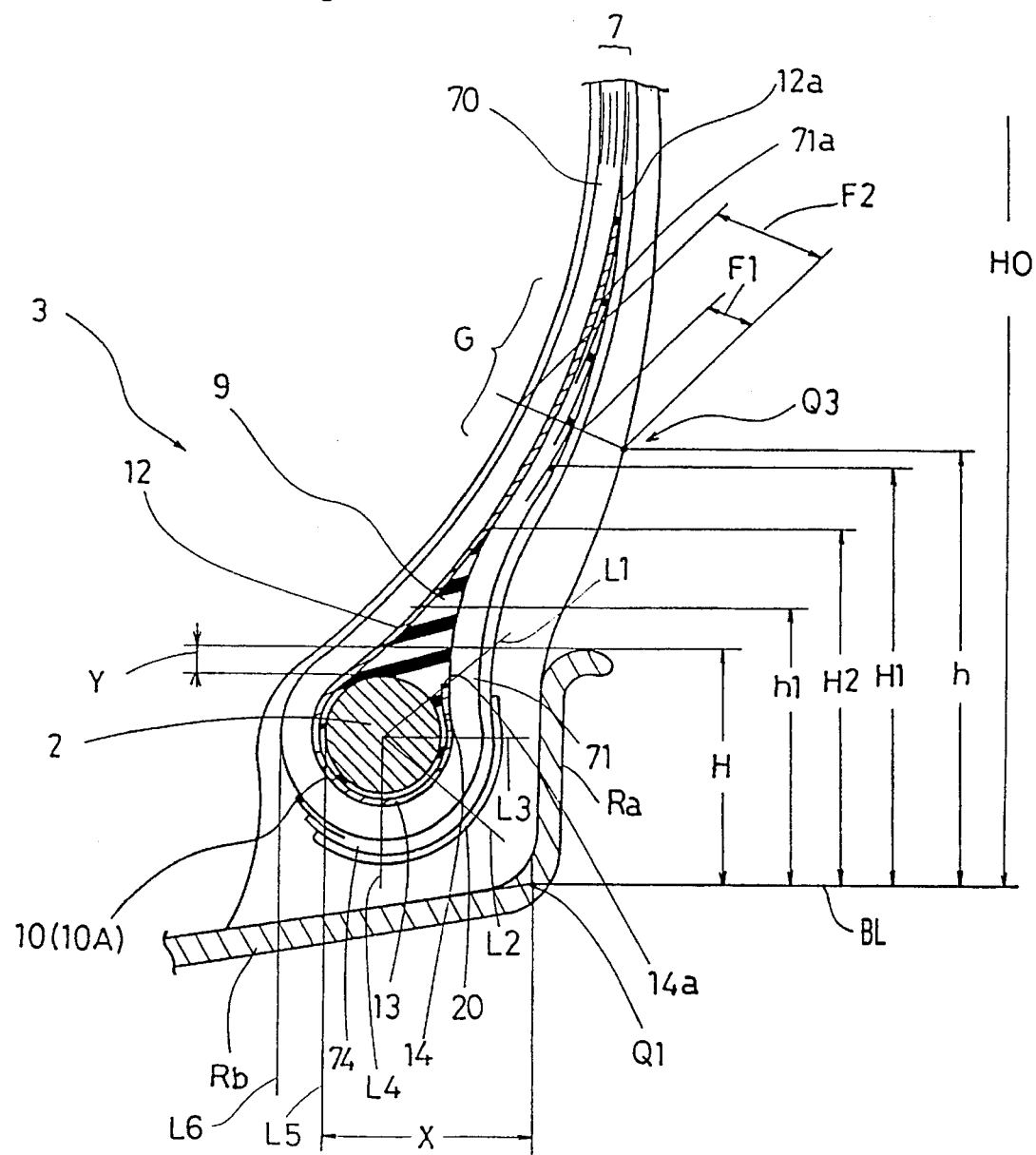
FIG. 2 is an enlarged cross sectional view of the bead and lower sidewall portion thereof.
Figure 3:
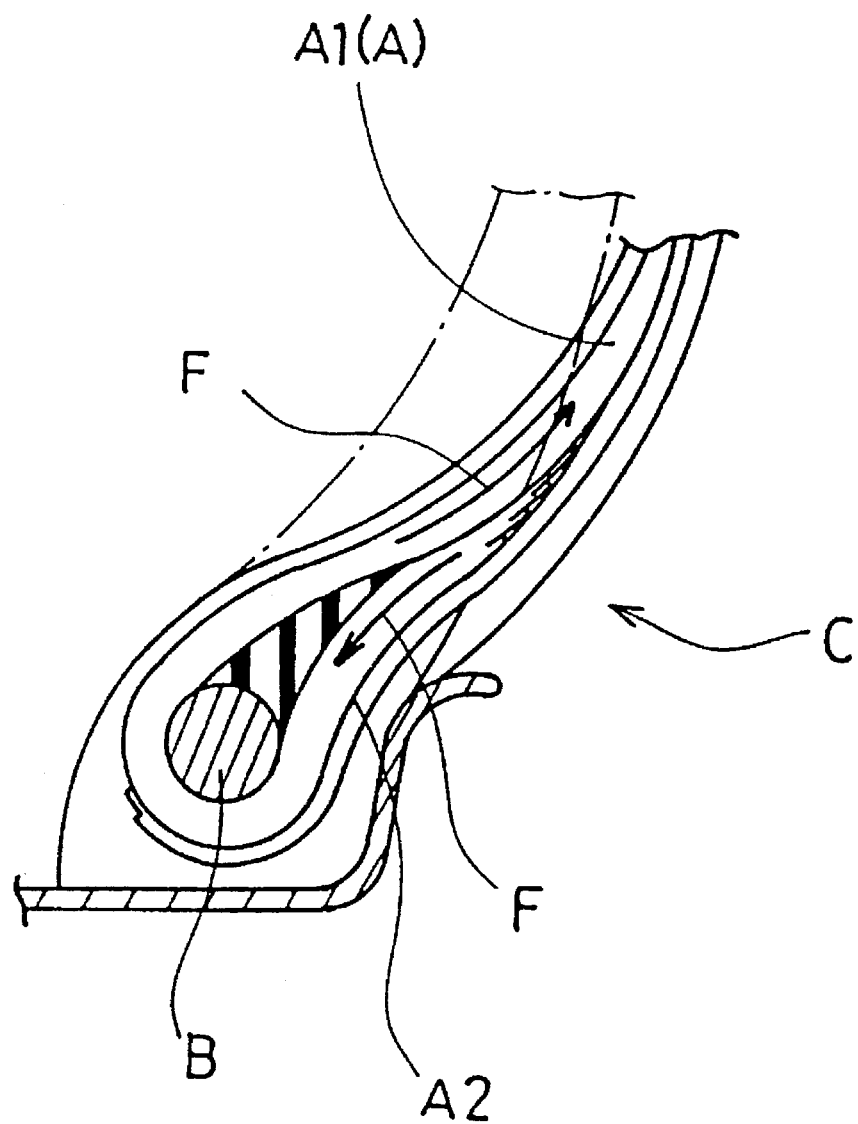
FIG. 3 is a cross sectional view explaining the prior art.

To facilitate this positioning, each bead portion 3 in this embodiment is further provided with a heel cord layer 20 which is off to the lower right of the center of the bead core in FIG.2.

The heel cord layer 20 is disposed on the outer surface of the carcass 7, in this embodiment on the outer surface of the outer carcass 7B and adjacently to the bead base rubber, and the layer 20 extends therealong.

The radially outer edge of the heel cord layer 20 is positioned between straight lines L1 and L2 drawn from the center of the bead core at angles of ±40 degrees with respect to a straight line L3 drawn axially outwardly from the bead core center.

The radially inner edge of the heel cord layer 20 is terminated within the bead base rubber and positioned axially inward of a straight line L4 drawn radially inwardly from the bead core center and usually between straight lines L5 and L6 drawn radially inwardly from the axially inner edge of the bead core and the axially innermost point of the carcass lower portion surrounding the bead cope, respectively. In this embodiment, the radially inner edge of the outer carcass 7B is also terminated within the bead base rubber and positioned between the straight lines L5 and L6.

The heel cord layer 20 consists of at least one ply of rubberized parallel cords 21 laid at an angle of 45 to 90 degrees with respect to the tire equator. In this embodiment, one ply of aromatic polyamide fiber cords is used, but other organic fiber cords, e.g. nylon, polyester and the like can be used.

During the tire vulcanizing process using a mold, due to the presence of the heel cord layer 20, the bead cores is forced axially inwardly and radially outwardly. This shift of the bead core can be achieved without increasing the thickness of the bead base rubber. Therefore, bead retaining force or engaging force between the tire and rim can be maintained.

To mitigate the shear between the carcass 7 and the heel cord layer 20 and thereby to prevent separation therebetween, the cord spacing between the cords in the heel cord layer 20 and the carcass cords 8 in the adjacent carcass ply is preferably set to be 0.25 to 2.0 times the thickness D of the carcass cords 8. The thickness of the topping rubber therefor is determined to meet this limitation.

When the spacing is more than 2 times D, the rubber thickness of the bead base increases, and as a result, a bead retaining force is liable to decrease and the internal temperature is liable to increase.

When the spacing is less than 0.25 times D, the shear can not be mitigated and a separation failure is liable to occur.

For the topping rubber for the heel cord layer, one having a good adhesiveness to the carcass cord topping rubber, for example the same rubber as the carcass cord topping rubber or a similar one is used. The 100% modulus thereof is preferably in the range of 60 to 130% of that of the carcass cord topping rubber.

Such heel cord layer 20 has a further merit of protecting the carcass cords from the heat due to braking and chafing by the rim.

Test tires of size 46X17R20 for airplane were prepared and tested for bead durability. The test results are given in Table 1.

The test tires had the same tire structure as shown in FIG.1 except that no hell cord layer is disposed, and the specifications are also given in Table 1. Table 2 shows the specifications and characteristics of the carcass cord, belt cord, and buffer cords used in the test tires.

The durability test was conducted according to TSO-C62c, the United States Federal Aviation Administration Technical Standard Order. The test tire load was 120% of the rated service load, the running speed was 11 km/h, and the running distance was 3000 km.

As apparent from Table 1, the bead durability of Working Examples tires of the present invention were greatly improved in comparison with Reference tires.

TABLE 1

|  | Ex. 1 | Ex. 2 | Ex. 3 | Ref. 1 | Ref. 2 | Ref. 3 | Ref. 4 | Ref. 5 |
| --- | --- | --- | --- | --- | --- | --- | --- | --- |
| Carcass | | | | | | | | |
| Carcass ply No. | | | | | | | | |
| Inner | 4 | 4 | 4 | 4 | 4 | 4 | 4 | 4 |
| Outer | 2 | 2 | 2 | 2 | 2 | 2 | 2 | 2 |
| Cord | A-1 | A-1 | A-1 | A-1 | A-1 | A-1 | A-1 | A-1 |
| Angle (deg.) | 85 | 85 | 85 | 85 | 85 | 85 | 85 | 85 |
| Belt | | | | | | | | |
| Ply No. | 8 | 8 | 8 | 8 | 8 | 8 | 8 | 8 |
| Cord | B-1 | B-1 | B-1 | B-1 | B-1 | B-1 | B-1 | B-1 |
| Angle (deg.) | 0 | 0 | 0 | 0 | 0 | 0 | 0 | 0 |
| Buffer layer | | | | | | | | |
| Ply No. | 1 | 1 | 1 | 2 | 2 | — | 2 | 1 |
| Cord | C-1 | C-1 | C-1 | C-1 | C-1 | — | C-2 | C-1 |
| Angle (deg.) | 85 | 85 | 70 | 85 | 45 | — | 45 | 45 |
| Durability | | | | | | | | |
| Running distance | 3000 km * | 3000 km * | 3000 km * | 3000 km * | 900 km | 450 km | 1240 km | 850 km |
| Cord looseness | non | non | indication | occurred | occurred | occurred | occurred | occurred |

*run completely for the test running distance of 3000 km

TABLE 2

| Cord | A-1 | B-1 | C-1 | C-2 |
| --- | --- | --- | --- | --- |
| Material | nylon 6.6 | nylon 6.6 | nylon 6.6 | nylon 6.6 |
| Structure | 1890d/3 | 1680d/4 | 1890d/3 | 1260d/2 |
| Cord twist (turn/10 cm) | 26 | — | 26 | 53 |
| S5 (%) * | 6.2 | 4.8 | 6.2 | 7.6 |
| S10 (%) * | 9.5 | 8.2 | 9.5 | 11.0 |
| S20 (%) * | 14.7 | 11.3 | 14.7 | 17.0 |
| D5 (%/d)X10E4 * | 9.85 | 6.03 | 9.84 | 27.3 |
| D10 (%/d)X10E4 * | 15.08 | 9.36 | 15.08 | 39.6 |
| D20 (%/d)X10E4 * | 23.33 | 14.49 | 23.33 | 61.2 |
| Elongation at rupture (%) | 24.8 | 22.4 | 24.8 | 18.2 |
| Strength (kgf) | 48.2 | 52.5 | 48.2 | 22.0 |
| Initial elastic modulus (kgf/sq.mm) | 175 | 234 | 175 | 75 |

* S5, S10, S20 are elongations (%) at 5, 10, and 20 kgf load, respectively. D5, D10, D20 are quotients of S5, S10, S20 divided by the total denier number respectively.

We claim:

1. A tire and rim assembly for high speed and heavy duty use comprising a regular rim, the rim including a rim flange, and a tire, the tire including a pair of bead portions, a tread portion, a pair of sidewall portions extending between the tread edges and the bead portions, a pair of bead cores disposed one in each said bead portion, a radial carcass having at least one ply of carcass cords extending between the bead portions and turned up around the bead cores from the axially inside to the outside thereof to form two turned up portions and one main portion of the carcass, the carcass ply including carcass cords embedded in a carcass cord topping rubber, a bead apex disposed between the carcass main portion and each turned up portion and extending radially outwardly from the bead core, a buffer layer having a ply of buffer cords interposed between the carcass main portion and each turned up portion and extending radially inwardly to the bead portion to form an axially inner portion, the buffer layer turned up around said bead core and extending radially outwardly to form an axially outer portion, in a normal pressure condition in which the tire is mounted on its regular rim and inflated to its regular inner pressure, at least 80%, in number, of the spacings of reinforcing cords existing in a tire side portion defined between two points P1 and P2 being in the range of 0.25 to 2.0 times the thickness (D) of the carcass cords, the reinforcing cords including the carcass cords and the buffer cords, the cord spacings being defined as within each ply of the at least one carcass ply and the buffer layer, between adjacent carcass plies, and between the buffer layer and any adjacent carcass ply, wherein the point P1 is located on the outer surface of the tire at a height corresponding to the height of the flange of the rim, and the point P2 is located on the outer surface of the tire at a height of ⅓ times the tire section height, and the carcass cord topping rubber having the following properties:

a 100% modulus of from 40 to 70 kg/sq.cm, an elongation at rupture of from 200 to 350%, and a stress at rupture of from 150 to 300 kg/sq.cm, the radially outer edge of the axially inner portion of the buffer layer is disposed radially outward of the radially outer edge of the carcass turned up portion and radially inward of the maximum tire section width point within the tire sidewall portion, the radially outer edge of the axially outer portion of the buffer layer is disposed radially inward of the middle height position of the bead apex defined between the radially outer edge of the bead apex and the radially outer edge of the bead core, each said bead portion provided with a heel cord layer disposed between the carcass and a bead base rubber layer defining the bead base, said heel cord layer consisting of at least one ply of rubberized organic fiber cords laid at an angle of greater than 45 to 90 degrees with respect to the tire equator, said heel cord layer extending along the outer surface of the carcass so that the radially outer edge is positioned between two straight lines (L1 and L2) drawn from the center of the bead core at +40 degrees and −40 degrees, respectively, with respect to a straight line (L3) drawn axially outwardly from the bead core center, and the radially inner edge is positioned between two straight lines (L5 and L6) drawn radially inwardly from the axially inner edge of the bead core and the axially innermost point of the carcass lower portion surrounding the bead core, respectively, and the thickness of the carcass topping rubber measured from the surface to the carcass cords is in the range of ⅛ to 1 times the thickness (D) of the carcass cords, and said buffer layer consists of at least one ply of rubberized parallel organic fiber cords arranged at an angle of 70 to 90 degrees with respect to the tire equator, and the strength of said organic fiber cords of the buffer layer is not smaller than the strength of the carcass cords.

2. The assembly according to claim 1, wherein the 100% modulus of said carcass cord topping rubber is 45 to 55 kg/sq.cm, the elongation at rupture thereof is 280 to 340%, and the stress at rupture thereof is 200 to 250 kg/sq.cm.

3. The assembly according to claim 1, wherein all the cord spacings are in the range of 0.25 to 2.0 times the thickness (D) of the carcass cords.

4. A tire and rim assembly for high speed and heavy duty use comprising a regular rim, the rim including a rim flange, and a tire, the tire including a pair of bead portions, a tread portion, a pair of sidewall portions extending between the tread edges and the bead portions, a pair of bead cores disposed one in each said bead portion, a radial carcass having at least one ply of carcass cords extending between the bead portions and turned up around the bead cores from the axially inside to the outside thereof to form two turned up portions and one main portion of the carcass, the carcass ply including carcass cords embedded in a carcass cord topping rubber, a bead apex disposed between the carcass main portion and each turned up portion and extending radially outwardly from the bead core, a buffer layer having a ply of buffer cords interposed between the carcass main portion and each turned up portion and extending radially inwardly to the bead portion to form an axially inner portion, the buffer layer turned up around said bead core and extending radially outwardly to form an axially outer portion, in a normal pressure condition in which the tire is mounted on its regular rim and inflated to its regular inner pressure, at least 80%, in number, of the spacings of reinforcing cords existing in a tire side portion defined between two points P1 and P2 being in the range of 0.25 to 2.0 times the thickness (D) of the carcass cords, the reinforcing cords including the carcass cords and the buffer cords, the cord spacings being defined as within each ply of the at least one carcass ply and the buffer layer, between adjacent carcass plies, and between the buffer layer and any adjacent carcass ply, wherein the point P1 is located on the outer surface of the tire at a height corresponding to the height of the flange of the rim and the point P2 is located on the outer surface of the tire at a height of ⅓ times the tire section height, and the carcass cord topping rubber having the following properties:

a 100% modulus of from 40 to 70 kg/sq.cm, an elongation at rupture of from 200 to 350%, and a stress at rupture of from 150 to 300 kg/sq.cm, the radially outer edge of the axially inner portion of the buffer layer is disposed radially outward of the radially outer edge of the carcass turned up portion and radially inward of the maximum tire section width point within the tire sidewall portion, the radially outer edge of the axially outer portion of the buffer layer is disposed radially inward of the middle height position of the bead apex defined between the radially outer edge of the bead apex and the radially outer edge of the bead core, each said bead portion provided with a heel cord layer disposed between the carcass and a bead base rubber layer defining the bead base, said heel cord layer consisting of one ply of rubberized organic fiber cords laid at an angle of greater than 45 to 90 degrees with respect to the tire equator, said heel cord layer extending along the outer surface of the carcass so that the radially outer edge is positioned between two straight lies (L1 and L2) drawn from the center of the bead core at +40 degrees and −40 degrees, respectively, with respect to a straight line (L3) drawn axially outwardly from the bead core center, and the radially inner edge is positioned between two straight lines (L5 and L6) drawn radially inwardly from the axially inner edge of the bead core and the axially innermost point of the carcass lower portion surrounding the bead core, respectively, and the thickness of the carcass topping rubber measured from the surface to the carcass cords is in the range of ⅛ to 1 times the thickness (D) of the carcass cords, and the strength of said organic fiber cords of the buffer layer is not smaller than the strength of the carcass cords.

5. The assembly according to claim 4, wherein said buffer layer consists of at least one ply of rubberized parallel organic fiber cords arranged at an angle of 70 to 90 degrees with respect to the tire equator.

6. The assembly according to claim 4, wherein said buffer layer consists of one ply of rubberized parallel organic fiber cords arranged at an angle of 70 to 90 degrees with respect to the tire equator.

* * * * *